(12) United States Patent
Chiu

(10) Patent No.: US 7,931,284 B2
(45) Date of Patent: Apr. 26, 2011

(54) CASTER DEVICE WITH DETACHABLE CASTERS FOR PORTABLE DEHUMIDIFIER

(75) Inventor: Ming-Tsung Chiu, Chung-Ho (TW)

(73) Assignee: New Widetech Industries Co., Ltd., Chung-Ho, Taipei Hsien (TW)

( * ) Notice: Subject to any disclaimer, the term of this patent is extended or adjusted under 35 U.S.C. 154(b) by 377 days.

(21) Appl. No.: 12/326,784

(22) Filed: Dec. 2, 2008

(65) Prior Publication Data

US 2010/0132157 A1 Jun. 3, 2010

(51) Int. Cl.
*B60N 2/427* (2006.01)
(52) U.S. Cl. ............................................. 280/29; 16/30
(58) Field of Classification Search .................... 280/29, 280/30, 37, 79.1, 47.17, 39, 47.26, 646, 86.751; 16/30, 18 R, 29, 31 R
See application file for complete search history.

(56) References Cited

U.S. PATENT DOCUMENTS

| | | | | |
|---|---|---|---|---|
| 2,661,220 A * | 12/1953 | Davis | ............................... | 280/39 |
| 3,935,613 A * | 2/1976 | Kaneko | ............................... | 16/30 |
| 4,332,052 A * | 6/1982 | Remington | ........................ | 16/30 |
| 4,335,896 A * | 6/1982 | Koffler et al. | .............. | 280/47.17 |
| 4,422,212 A * | 12/1983 | Sheiman et al. | .................. | 16/29 |
| 4,719,663 A * | 1/1988 | Termini | ............................. | 16/30 |
| 5,253,389 A * | 10/1993 | Colin | ................................. | 16/30 |
| 5,428,866 A * | 7/1995 | Aschow | ............................. | 16/30 |
| 5,524,322 A * | 6/1996 | Muehlen | .......................... | 16/29 |
| 5,740,584 A * | 4/1998 | Hodge et al. | ...................... | 16/30 |
| 5,934,639 A * | 8/1999 | Chiang et al. | ..................... | 16/30 |
| 7,600,294 B2 * | 10/2009 | Hartman | ........................... | 16/30 |

* cited by examiner

*Primary Examiner* — Hau V Phan
(74) *Attorney, Agent, or Firm* — Pai Patent & Trademark Law Firm; Chao-Chang David Pai

(57) ABSTRACT

A caster device with detachable casters for a portable dehumidifier has a base mounted on a bottom of the portable dehumidifier, multiple positioning assemblies formed on the base and multiple casters respectively and detachably mounted between the positioning assemblies. Therefore, the casters are easily attached to the base for use or detached from the base for clean, repair or replacement.

6 Claims, 7 Drawing Sheets

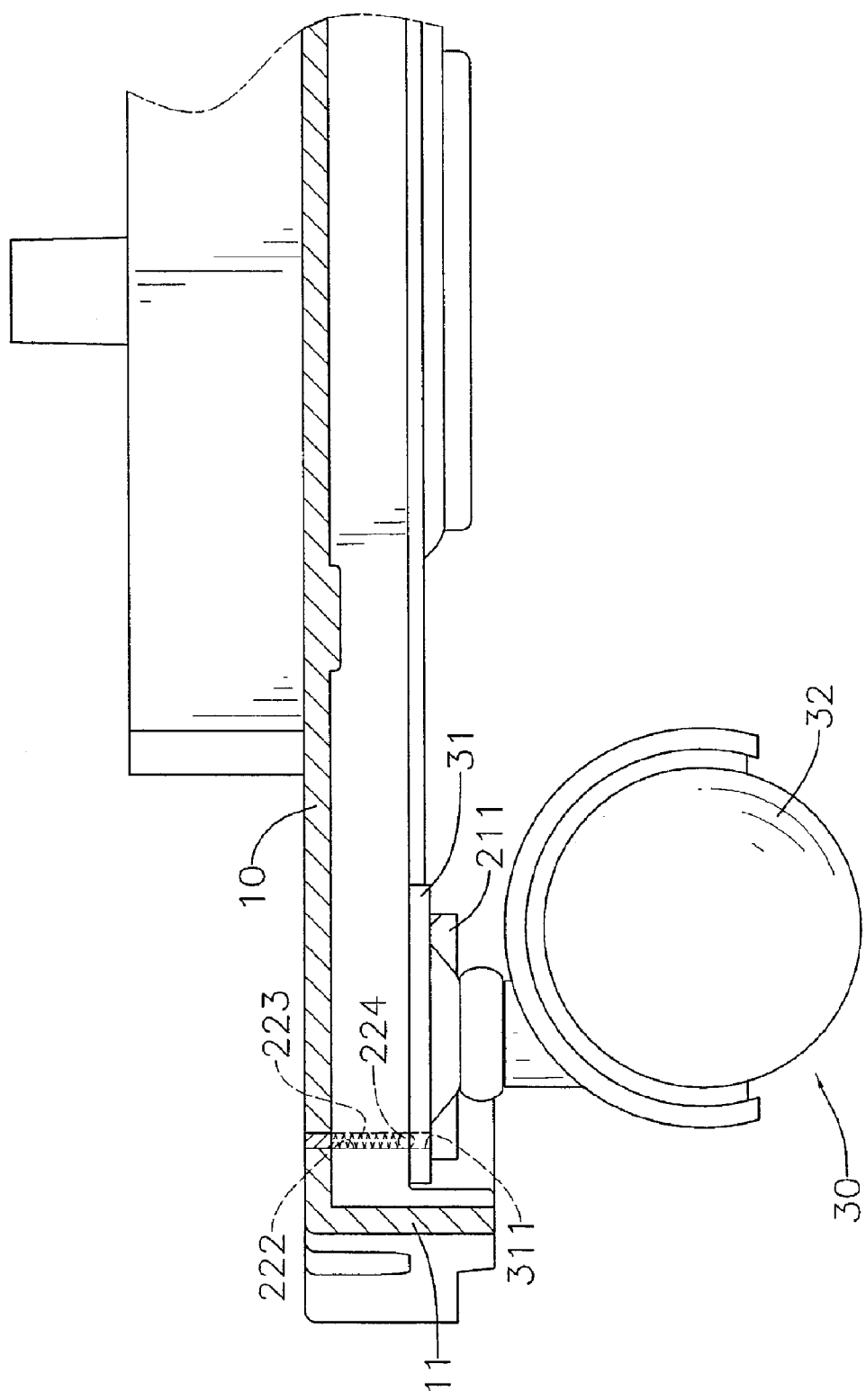

CASTER DEVICE WITH DETACHABLE CASTERS FOR PORTABLE DEHUMIDIFIER

BACKGROUND OF THE INVENTION

1. Field of the Invention

The present invention relates to a caster device for a portable dehumidifier, especially to a caster device with detachable casters to allow convenient replacement of the casters.

2. Description of the Prior Arts

Unlike a stationary air conditioner such as window-type air conditioner or split-type air conditioner that is fixed high on a window or a wall, a portable air conditioner is placed on a ground without causing damage to the window or the wall and is moved and stored conveniently. Therefore, the portable air conditioner becomes popular. A dehumidifier is one kind of the air conditioners that regulates indoor humidity.

A conventional portable dehumidifier has multiple casters being securely attached to a bottom of the conventional portable dehumidifier for convenient moves of the conventional portable dehumidifier. However, the assembling processes are complicated while attaching the casters to the bottom of the conventional portable dehumidifier one by one with fasteners such as screws and the like. Furthermore, a broken caster is hard to detach from the conventional portable dehumidifier to replace with a new caster.

To overcome the shortcomings, the present invention provides a caster device with detachable casters for a portable dehumidifier to mitigate or obviate the aforementioned problems.

SUMMARY OF THE INVENTION

The main objective of the present invention is to provide a caster device with detachable casters for a portable dehumidifier. The caster device has a base mounted on a bottom of the portable dehumidifier, multiple positioning assemblies formed on the base and multiple casters respectively and detachably mounted between the positioning assemblies. Therefore, the casters are easily attached to the base for use or detached from the base for clean, repair or replacement.

Other objectives, advantages and novel features of the invention will become more apparent from the following detailed description when taken in conjunction with the accompanying drawings.

BRIEF DESCRIPTION OF THE DRAWINGS

FIG. 7 is an enlarged side view in partial section of the caster device in FIG. 1, showing each positioning ball engaging in each positioning recess of the mounting panel of the caster.

DETAILED DESCRIPTION OF THE PREFERRED EMBODIMENTS

Figure 1:
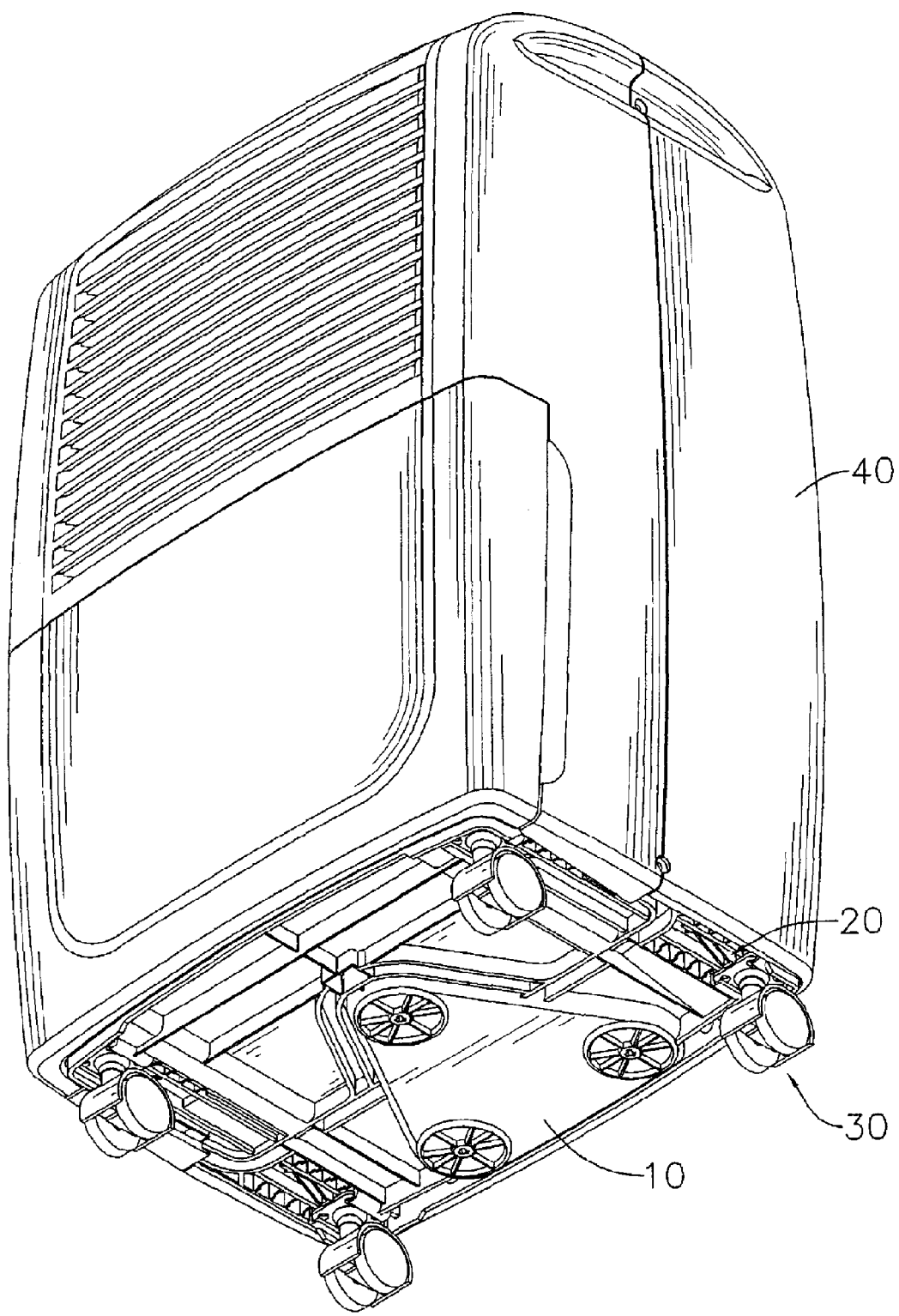
FIG. 1 is an operational perspective bottom view of a caster device with detachable casters for a portable dehumidifier in accordance with the present invention.
Figure 2:
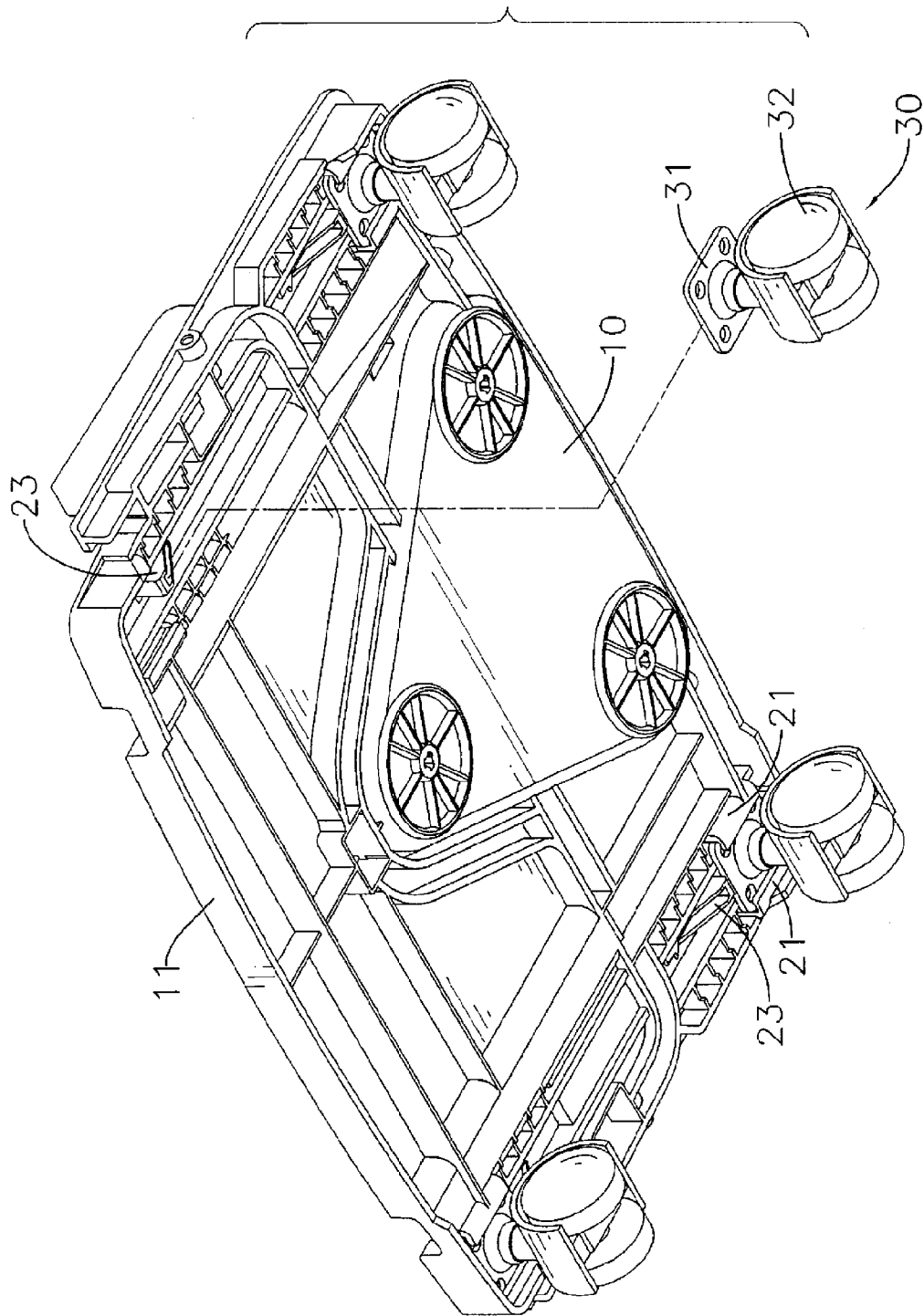
FIG. 2 is a partially exploded perspective view of the caster device in FIG. 1.

With reference to FIGS. 1 and 2, a caster device with detachable casters in accordance with the present invention is mounted on a bottom of a portable dehumidifier (40) and comprises a base (10), multiple positioning assemblies (20) and multiple casters (30).

Figure 4:
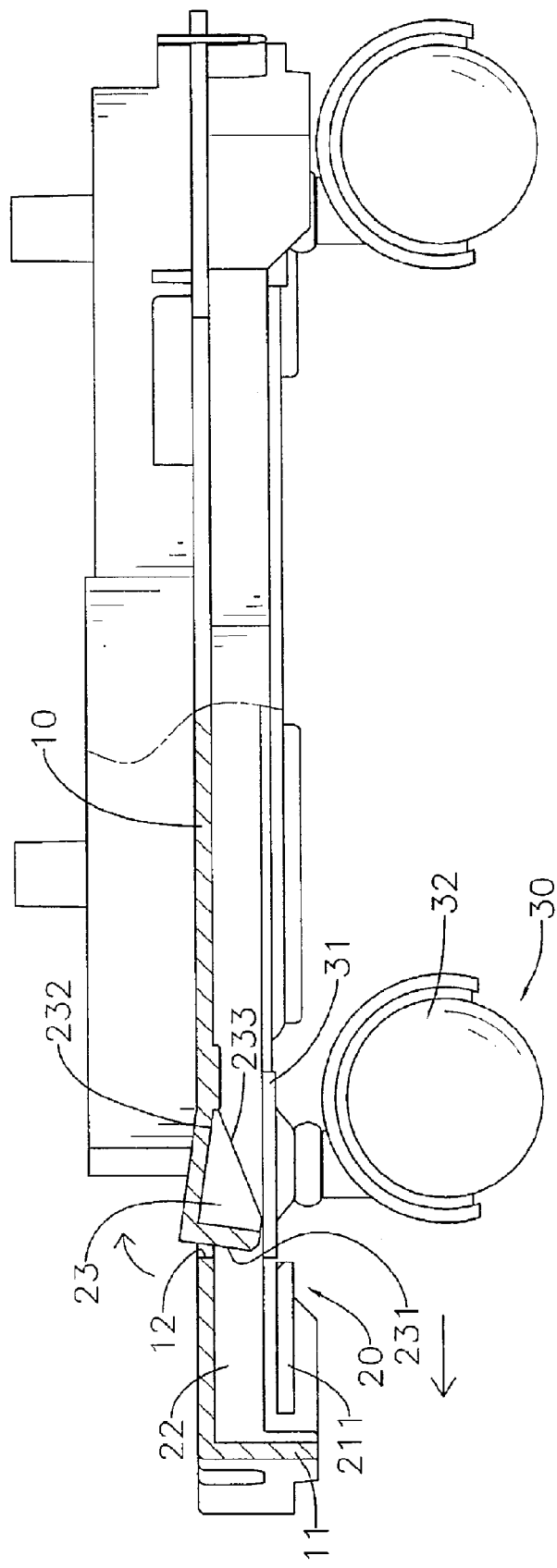
FIG. 4 is an operational side view in partial section of the caster device in FIG. 1, showing a lock protrusion being pressed by a mounting panel of a caster.

With further reference to FIG. 4, the base (10) is securely mounted on the bottom of the portable dehumidifier (40), has a top panel, and may have a perimeter panel (11), multiple mounting holes (12) and multiple mounting walls. The mounting holes (12) are separately formed through the top panel of the base (10). The mounting walls of the base (10) are respectively formed around the mounting holes (12) of the base (10).

Figure 3:
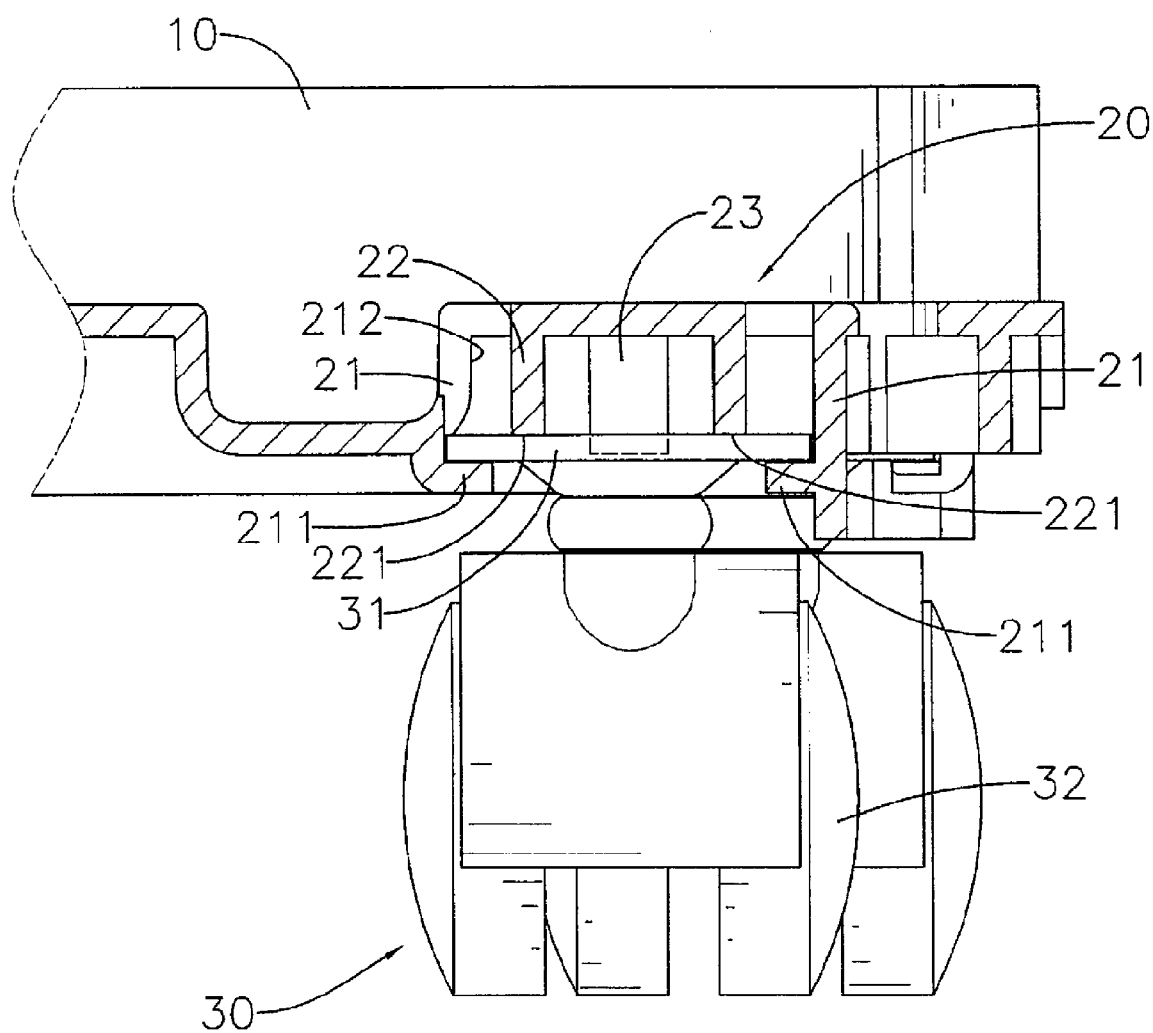
FIG. 3 is an enlarged front view in partial section of the caster device in FIG. 1.
Figure 6:
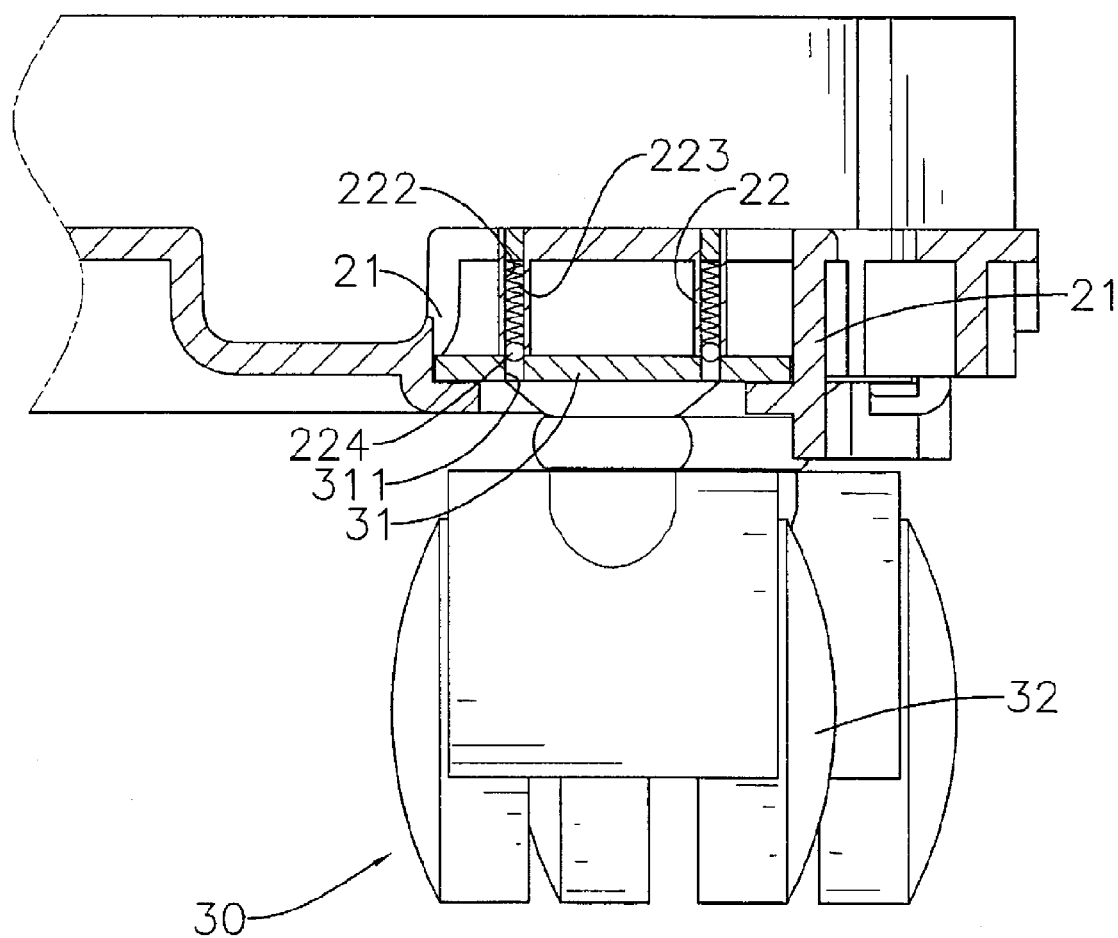
FIG. 6 is an enlarged front view in partial section of the caster device in FIG. 1, showing at least one positioning ball engaging in at least one positioning recess of the mounting panel of the caster.

With further reference to FIGS. 3 and 6, the positioning assemblies (20) are formed on the top panel of the base (10). Each positioning assembly (20) has two holders (21) and may have at least one abutting protrusion (22), a locking protrusion (23), at least one resilient device (223) and at least one positioning ball (224).

The holders (21) are separately and parallelly formed on and protrude downwardly from the top panel of the base (10) and may be formed between the perimeter panel (11) and a corresponding mounting hole (12) of the base (10). Each holder (21) has a distal edge, a support (211) and an elongated recess (212). The support (211) is formed transversely on the distal edge of the holder (21). The support (211) of one holder (21) of each positioning assembly (20) is toward the support (211) of the other holder (21) of the positioning assembly (20). The elongated recess (212) is formed between the top panel of the base (10) and the support (211) and may have two opposite open ends. The open ends of the elongated recess (212) respectively correspond to the perimeter panel (11) and the corresponding mounting hole (12) of the base (10).

With further reference to FIG. 7, the at least one abutting protrusion (22) is formed on and protrude downwardly from the top panel of the base (10) between the holders (21). Each abutting protrusion (22) has a distal surface (221) and may have at least one mounting recess (222). The distal surface (221) is parallel to the top panel of the base (10) and alongside the elongated recesses (212) of the holders (21). The at least one mounting recess (222) is formed in the distal surface (221) of the abutting protrusion (22). Each mounting recess (222) has a taper open end.

Figure 5:
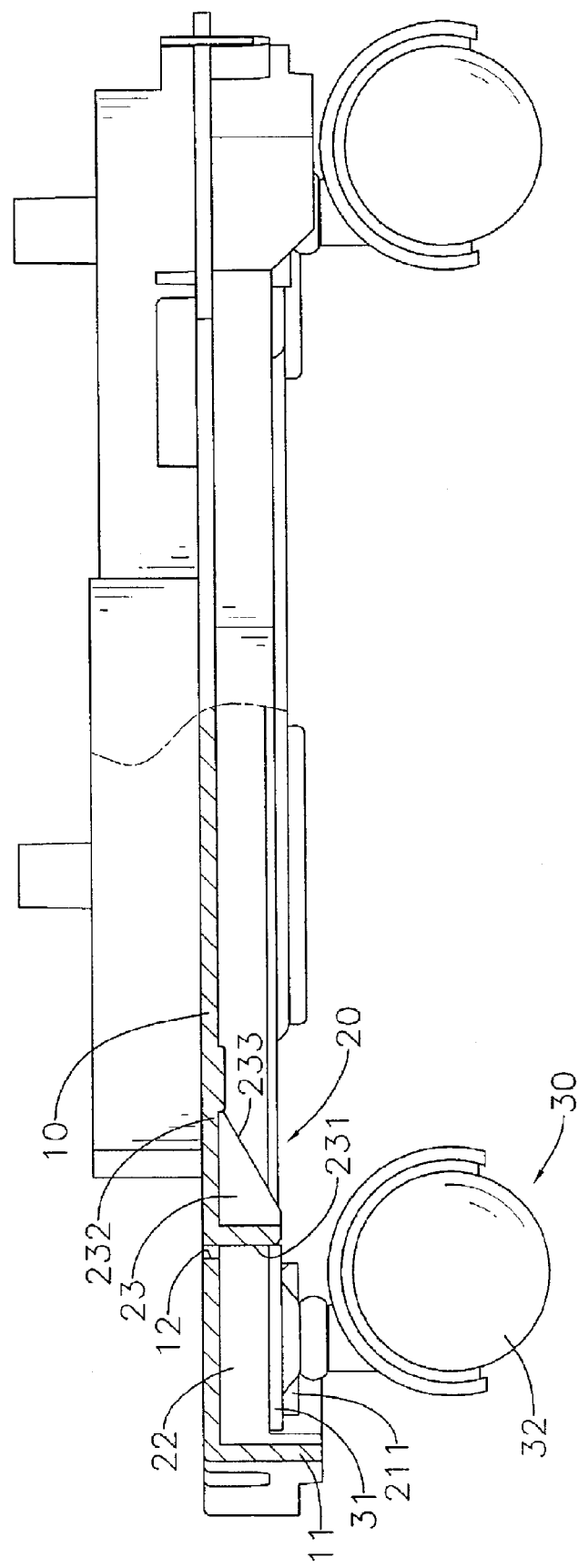
FIG. 5 is a side view in partial section of the caster device in FIG. 1.

With further reference to FIG. 5, the locking protrusion (23) protrudes from a corresponding mounting wall of the base (10), is mounted in the corresponding mounting hole (12) of the base (10) and has a proximal edge (232), a distal surface (231) and a guiding surface (233). The proximal edge (232) is formed on the corresponding mounting wall of the base (10) and is resilient to allow the locking protrusion (23) to be pivoted in the mounting hole (12) of the base (10). The distal surface (231) is perpendicular to the top panel of the base (10) and has a distal edge. The guiding surface (233) is formed between the proximal edge (232) of the locking protrusion (23) and the distal edge of the distal surface (231).

Each resilient device (223) is mounted in a corresponding mounting recess (222) of the abutting protrusion (22) and may be a spring.

Each positioning ball (224) is mounted in a corresponding mounting recess (222) of the abutting protrusion (22), is pushed by a corresponding resilient device (223) and protrudes out of the taper open end of the corresponding mounting recess (222) of the abutting protrusion (22).

The casters (30) are respectively and detachably mounted between the positioning assemblies (20). Each caster (30) has a mounting panel (31) and a wheel (32).

The mounting panel (31) is mounted in the elongated recesses (212) of the holders (21), is mounted on the supports (211) of the holders (21) of a corresponding positioning assembly (20), has a perimeter edge, a positioning surface and a supporting surface and may have at least one indentation (311). The positioning surface of the mounting panel (31) corresponds to the top panel of the base (10) and may correspond to the distal surface (221) of the abutting protrusion (22). The supporting surface of the mounting panel (31) corresponds to and is mounted on the supports (211) of the holders (21) of the corresponding positioning assembly (20). The at least one indentation (311) is formed in the positioning surface of the mounting panel (31), selectively aligns with the mounting recess (222) of the abutting protrusion (22) and selectively engage the positioning ball (224) in the mounting recess (222).

The wheel (32) is mounted securely on the supporting surface of the mounting panel (31) and is mounted slidably between the holders (22) of the corresponding positioning assembly (20).

With reference to FIG. 4, the perimeter edge of the mounting panel (31) of the caster (30) moves along the guiding surface (233) of the locking protrusion (23) of the corresponding positioning assembly (20) and presses the locking protrusion (23). Therefore, when the mounting panel (31) of the caster (30) slides into the elongated recesses (212) of the holders (21) of the corresponding positioning assembly (20), the locking protrusion (23) springs back to its original position and holds the mounting panel (31) of the caster (30) securely between the perimeter panel (11) of the base (10), the holders (21) of the corresponding positioning assembly (20) and the distal surface (231) of the locking protrusion (23). Afterwards, just pressing the locking protrusion (23) of the positioning assembly (20), the caster (30) is easily detached from the base (10).

The caster device with detachable casters for the portable dehumidifier as described has the following advantages. The casters (30) are easily attached to the base (10) without any fasteners for use and are also easily detached from the base (10) for clean, repair or replacement.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A caster device comprising
   a base having a top panel;
   multiple positioning assemblies being formed on the top panel of the base, and each positioning assembly having
      two holders being separately and parallelly formed on and protruding from the top panel of the base, and each holder having
         a distal edge;
         a support being formed transversely on the distal edge of the holder toward the support of the other holder; and
         an elongated recess being formed between the top panel of the base and the support, corresponding to the elongated recess of the other holder; and
   multiple casters being respectively and detachably mounted between the positioning assemblies, and each caster having
      a mounting panel being mounted in the elongated recesses of the holders and on the supports of the holders and having
         a positioning surface corresponding to the top panel of the base; and
         a supporting surface corresponding to and being mounted on the supports of the holders of the corresponding positioning assembly; and
      a wheel being securely mounted on the supporting surface of the mounting panel and being slidably mounted between the holders of the corresponding positioning assembly.

2. The caster device as claimed in claim 1, wherein each positioning assembly further has at least one abutting protrusion being formed on and protruding downwardly from the top panel of the base between the holders, and each abutting protrusion having a distal surface being parallel to the top panel of the base and alongside the elongated recesses of the holders and corresponding to the positioning surface of the mounting panel of a corresponding caster.

3. The caster device as claimed in claim 2, wherein
   the base further has
      a perimeter edge;
      a perimeter panel being formed around the perimeter edge of the base;
      multiple mounting holes being separately formed through the top panel of the base; and
      multiple mounting walls being respectively formed around the mounting holes of the base;
   the positioning assembly is respectively formed between the perimeter panel and the mounting holes of the base, and each positioning assembly further has a locking protrusion protruding from a corresponding mounting wall of the base, being mounted in the corresponding mounting hole of the base and having
      a proximal edge being attached to the corresponding mounting wall of the base and being resilient;
      a distal surface being perpendicular to the top panel of the base and having a distal edge; and
      a guiding surface being formed between the proximal edge of the locking protrusion and the distal edge of the distal surface;
   the elongated recess of each holder of each positioning assembly further has two opposite open ends respectively corresponding to the perimeter panel and the corresponding mounting hole of the base; and
   the holders of each positioning assembly are formed between the perimeter panel and a corresponding mounting holes of the base.

4. The caster device as claimed in claim 3, wherein
   each abutting protrusion of each positioning assembly further has at least one mounting recess being formed in the distal surface of the abutting protrusion, and each mounting recess having a taper open end;
   the mounting panel of each caster further has at least one indentation being formed in the positioning surface of the mounting panel and selectively corresponding to the mounting recess of the abutting protrusion; and
   each positioning assembly further has at least one resilient device being mounted in a corresponding mounting recess of the abutting protrusion; and at least one positioning ball being mounted in a corresponding mounting recess of the abutting protrusion, being pushed by a corresponding resilient device, protruding out of the taper open end of the corresponding mounting recess of the abutting protrusion and selectively engaging in the indentation of the mounting panel.

5. The caster device as claimed in claim 2, wherein each abutting protrusion of each positioning assembly further has at least one mounting recess being formed in the distal surface of the abutting protrusion, and each mounting recess having a taper open end;

the mounting panel of each caster further has at least one indentation being formed in the positioning surface of the mounting panel and selectively corresponding to the mounting recess of the abutting protrusion; and each positioning assembly further has
- at least one resilient device being mounted in a corresponding mounting recess of the abutting protrusion; and
- at least one positioning ball being mounted in a corresponding mounting recess of the abutting protrusion, being pushed by a corresponding resilient device, protruding out of the taper open end of the corresponding mounting recess of the abutting protrusion and selectively engaging in the indentation of the mounting panel.

6. The caster device as claimed in claim 1, wherein the base further has
- a perimeter edge;
- a perimeter panel being formed around the perimeter edge of the base;
- multiple mounting holes being separately formed through the top panel of the base; and
- multiple mounting walls being respectively formed around the mounting holes of the base;

the positioning assembly further has a locking protrusion protruding from a corresponding mounting wall of the base, being mounted in the corresponding mounting hole of the base and having
- a proximal edge being attached to the corresponding mounting wall of the base and being resilient;
- a distal surface being perpendicular to the top panel of the base and having a distal edge; and
- a guiding surface being formed between the proximal edge of the locking protrusion and the distal edge of the distal surface;

the elongated recess of each holder of each positioning assembly further has two opposite open ends respectively corresponding to the perimeter panel and the corresponding mounting hole of the base; and the holders of each positioning assembly are formed between the perimeter panel and a corresponding mounting holes of the base.

* * * * *